United States Patent [19]

Mein

[11] Patent Number: 5,178,095
[45] Date of Patent: Jan. 12, 1993

[54] MILKING SYSTEM WITH POSITIVE PRESSURE ON THIN LINER

[75] Inventor: Graeme A. Mein, Madison, Wis.

[73] Assignee: DEC International, Inc., Madison, Wis.

[21] Appl. No.: 714,491

[22] Filed: Jun. 13, 1991

[51] Int. Cl.$^5$ .............................................. A01J 5/00
[52] U.S. Cl. .................... 119/14.47; 119/14.02
[58] Field of Search ............... 119/14.02, 14.47, 14.48, 119/14.49, 14.50, 14.53, 14.51, 14.52, 14.41, 14.27, 14.28, 14.37, 14.38, 14.42, 14.39, 14.4

[56] References Cited

U.S. PATENT DOCUMENTS

| | | | |
|---|---|---|---|
| 1,945,386 | 1/1934 | Stampen | 119/14.52 |
| 2,997,980 | 8/1961 | Noorlander . | |
| 3,096,740 | 7/1963 | Noorlander . | |
| 3,255,732 | 6/1966 | Raut | 119/14.52 |
| 3,289,634 | 12/1966 | Simons | 119/14.52 |
| 3,550,557 | 12/1970 | Goldsmith | 119/14.49 |
| 3,611,993 | 10/1971 | Norton | 119/14.47 |
| 3,967,587 | 7/1976 | Noorlander | 119/14.52 |
| 4,315,480 | 2/1982 | Noorlander . | |
| 4,324,201 | 4/1982 | Larson . | |
| 4,425,872 | 1/1984 | Mills | 119/14.52 |
| 4,530,307 | 7/1985 | Thompson . | |
| 4,745,881 | 5/1988 | Larson . | |
| 4,756,275 | 7/1988 | Larson . | |
| 4,869,205 | 9/1989 | Larson . | |

FOREIGN PATENT DOCUMENTS

| | | | |
|---|---|---|---|
| 410033 | 2/1969 | Australia | 119/14.52 |
| 0065871 | 12/1982 | European Pat. Off. . | |
| 8400874 | 3/1984 | European Pat. Off. | 119/14.47 |

OTHER PUBLICATIONS

"Milking System Design and Performance", Francis F. Smith et al, The University of California Cooperative Extension, WREP No. 8, Dec. 1978, pp. 20-22.
"Hydraylic Milking—Control Within The Teat-Cup", R. J. Grindal, International Mastitis Symposium, Macdonald College, Quebec, Canada, Aug. 14-15, 1987, pp. 89-99.
"Responses Of The Bovine Teat To Machine Milking: Measurement of Changes In Thickness Of The Teat Apex", J. Hamann and G. Mein, Journal of Dairy Research (1988), 55 pp. 331-338.
"Measurement Of Machine-Induced Changes In Thickness Of The Bovine Teat" J. Hamann and G. Mein, Journal of Dairy Research (1990), 57, pp. 495-505.
"Recent Developments In Milking Machine Research", Graeme A. Mein, 29th Annual Meeting National Mastitis Council, Inc., Louisville, KY, Feb. 12-14, 1990, pp. 3-13.
"Teat Cup And Claw" D. S. M. Phillips, Proceedings of Third Australian Machine Milking Conference, Hobart, Tasmania, 1965, pp. 132-143.
"Proceedings Of The Symposium On Machine Milking" 1968, G. Wehowski, The National Institute For Research in Dairying, Shinfield, Reading, England, 1969, pp. 134-135.
"A Comparison Of The Milking Characteristics Of Teat Cup Liners", I. McD. Gibb and G. A. Mein, The Australian Journal of Dairy Technology, Dec. 1976, pp. 148-153.
"Machine Milking and Lactation", Editors Bramley et al, Queen City Printer, Inc., Burlington, VT 05402, 1992, pp. 102, 103, 104, 105, 124, 125, 198, 199, 210.

Primary Examiner—John G. Weiss
Attorney, Agent, or Firm—Andrus, Sceales, Starke & Sawall

[57] ABSTRACT

A milking system combines the use of a thin-walled non-distensible floppy liner (82) with the application of positive pressure during the off portion of the milking cycle, and overcomes prior problems of congestion, oedema, hyperkeratosis, and slow milking. In a further aspect, the thin-walled floppy liner is operated as a pressure switch limiting the amount of negative pressure applied to the lower tip of the teat (16). In a further aspect, cross-contamination from another teat through the milking claw (36) is reduced by minimizing volume change within the liner (82) below the teat (16) during milking.

16 Claims, 4 Drawing Sheets

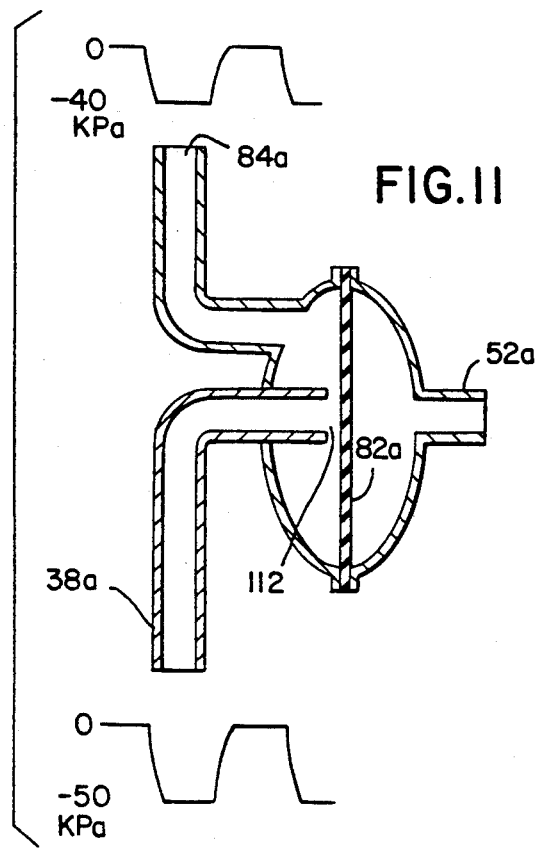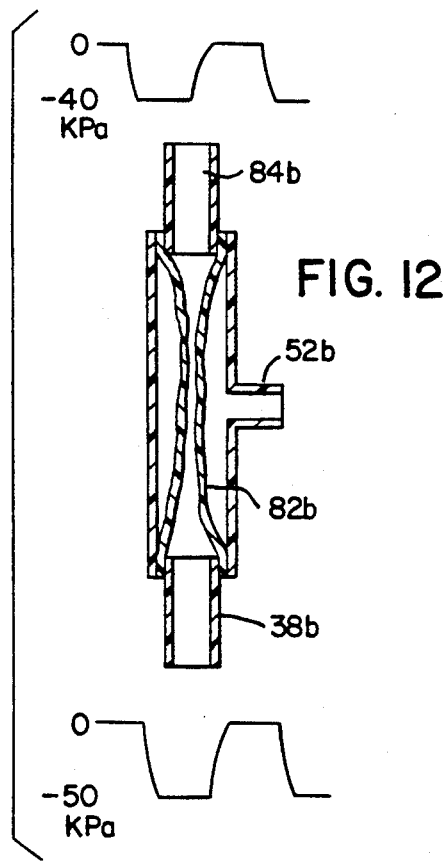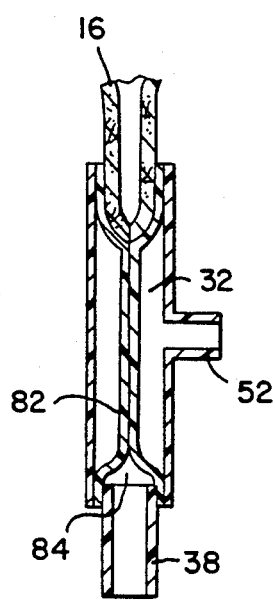

MILKING SYSTEM WITH POSITIVE PRESSURE ON THIN LINER

BACKGROUND

The invention relates to a method and apparatus for milking mammals, including cows.

Milking systems withdraw milk from the milk secreting glands of mammals by applying negative pressure, i.e. vacuum, to the teat. A plurality of teat cups are provided, each having a liner, or inflation, around a respective teat, and defining a milk flow passage within the liner below the teat, and a pulsation chamber outside the liner between the liner and the teat cup. The milk flow passage within the liner supplies milk to a milking claw which also receives milk from milk flow passages of other liners of other teat cups.

Simply supplying a constant vacuum to the teat is not desirable because it causes the tissue of the teat to become engorged with blood and lymph. When these fluids are confined to their normal spaces within the teat, the condition is called congestion. When the fluids leave their normal spaces, it is called oedema. These conditions may result in pain or discomfort to the mammal being milked, and swelling of the tissue which may constrict the duct through which milk is being withdrawn, thereby slowing the flow of milk. The slowing of milk flow due to the effects of congestion may be accompanied by a reduced volume of milk available for removal because the discomfort may interfere with the milk ejection reflex by which the mammal presents her milk to the teat.

Various attempts have been made to ameliorate the undesirable effects of vacuum on the teat by carefully shaping the teat cup and liner to support the teat as well as possible, and by periodically relieving the vacuum to the teat. The liner periodically collapses around and below the teat, providing massage to the teat. The massage compresses the end of the teat, thereby actively forcing fluids out of the teat apex. The massaging action of the liner also provides stimulation to the teat whereby the milk ejection reflex is strengthened. In some cases, the milk ejection reflex may be elicited solely by the action of the pulsating liner. Various types of liners are known in the art, for example "A Comparison Of The Milking Characteristics Of Teat Cup Liners" I. McD. Gibb and G. A. Mein, The Australian Journal of Dairy Technology, December, 1976, pages 148-153, and U.S. Pat. Nos. 2,997,980, 3,096,740, 4,315,480, 4,324,201, 4,530,307, 4,745,881, 4,756,275 and 4,869,205. The milking cycle has an on portion and an off portion. Milk is withdrawn from the teat through the liner to the claw during the on portion. During the off portion, the closed liner stops milk flow from the teat.

In one aspect of the present invention, a new combination is provided using positive pressure with a thin-walled floppy liner. Thin-walled floppy liners are known in the prior art, "Teat Cup and Claw" D.S.M. Phillips, Proceedings of Third Australian Machine Milking Conference, Hobart, Tasmania, 1965, pages 132-143. The use of positive pressure in the milking cycle is also known in the prior art: "Proceedings of the Symposium on Machine Milking 1968" G. Wehowski, The National Institute for Research in Dairying, Shinfield, Reading, England, 1969, pages 134-135; "Responses of the Bovine Teat to Machine Milking: Measurement of Changes in Thickness of the Teat Apex", Jorn Hamann and Graeme A. Mein, Journal of Dairy Research (1988), 55, 331-338; "Measurement of Machine-Induced Changes in Thickness of the Bovine Teat", Jorn Hamann and Graeme A. Mein, Journal of Dairy Research (1990), 57, 495-505; "Recent Developments in Milking Machine Research", Graeme A. Mein, 29th Annual Meeting National Mastitis Council, Inc., Louisville, Kentucky, Feb. 12-14, 1990, pages 3-13.

Though thin floppy liners have been known for some time, they have not been successfully used. Observed results include congestion, oedema, and slow milking. In the present invention, these failures are overcome by using positive pressure during the off portion of the milking cycle. In the present invention, the liner is a thin-walled non-distensible floppy member substantially conforming its shape to the teat, and of itself providing substantially no load on the teat. The use of such liner together with the application of positive pressure, relative to atmospheric pressure, provides a combination in which the main force applied to the teat during the off portion of the milking cycle is due to the positive pressure in the pulsation chamber which is uniformly applied at a controlled level along the barrel of the teat, and not just to the tip of the teat. A similar compressive load is applied to all the teats irrespective of their shape and size when the liner is compressed in each pulsation cycle. The cyclic compressive load is applied uniformly over most of the teat surface and controlled at a predetermined physiologically acceptable level by the pressure in the pulsation chamber.

Prior uses of cyclic application of positive pressure in the pulsation chamber have improved blood circulation, but have resulted in greater damage to the lower tip of the teat. Such prior uses involved thicker walled liners, and only the lower tip of the teat is subjected to cyclic compression by the closing liner. In the latter applications, the load varies with shape and size of the teat and with the degree of congestion of the teat. Furthermore, the high localized force results in varying degrees of hyperkeratosis around the external teat orifice. Furthermore, the barrel of the teat is not squeezed by the closure of such liner. Hence, the teat wall becomes thicker because of increased congestion and oedema, especially near the end of milking, i.e. during the low flow rate period or at the end of this period when no milk is flowing.

In the present invention, a controlled cyclic pressure is applied to the lower tip of the teat and along the barrel of the teat thereabove by means of a thin-walled floppy non-distensible liner, and blood circulation is maintained at a physiologically acceptable level within the walls of the teat barrel as well as the teat lower tip. The combination of controlled positive pressure and a thin non-distensible liner minimizes congestion, oedema, and damage to the lower tip of the teat. Teats are softer after milking, and teat condition is improved.

In another aspect of the invention, a thin-walled floppy liner is operated as a pressure switch limiting the amount of negative pressure applied to the lower tip of the teat. A negative first pressure is applied through the claw to the milk flow passage at the lower end of the liner. Pressure in the pulsation chamber is decreased during the on portion of the milking cycle to a negative second pressure. The second pressure is greater than the first pressure. The thin-walled floppy liner is closed and blocks communication of the negative first pressure to the lower tip of the teat and limits the amount of negative pressure applied to the lower tip of the teat to the noted negative second pressure acting on the thin-walled floppy liner engaging the lower tip of the teat. Milk flow from the lower tip of the teat within the thin-walled floppy liner increases the pressure within the thin-walled floppy liner to equalize and slightly exceed the pressure in the pulsation chamber outside the thin-walled floppy liner to slightly open the milk flow passage until milk flow from the lower tip of the teat decreases to reduce the pressure within the thin-walled floppy liner such that the latter closes. The pressure in the pulsation chamber is increased during the off portion of the milking cycle to a positive third pressure to collapse the thin-walled floppy liner and tightly close the milking passage and to apply the positive third pressure along the teat by acting on the thin-walled floppy liner engaging the teat.

In another aspect, the invention reduces the chances of cross-contamination between teats. As the liner opens and closes, there is a volume change within the liner below the teat which displaces and moves air back and forth. This volume change and air movement raises the possibility of cross-contamination from another teat through the claw. Thus, infection of one teat may spread to other teats. The present invention only partially opens the liner with minimum volume change below the teat to permit milk flow, which minimum volume change below the teat reduces the chances of cross-contamination from another teat. The invention enables the noted partial opening of the liner without resorting to hydraulic milking, "Hydraulic Milking-Control Within The Teat-Cup", R.J. Grindal, Proceedings of International Mastitis Symposium, MacDonald College, Quebec, Canada, Aug. 14–15, 1987, or otherwise resorting to fluctuations in the vacuum applied through the claw or special valving in the vacuum line through the claw, European Patent 0065871, Dec. 1, 1982. The present invention enables the noted partial opening of the liner while still using a conventional vacuum system wherein a substantially constant vacuum (negative pressure) is applied through the claw to the interior of the lower end of the liner throughout the milking cycle. A differential pressure is applied across the liner during the on portion of the milking cycle such that the liner only partially opens, with minimum volume change within the liner below the teat, but enough to permit milk flow.

BRIEF DESCRIPTION OF THE DRAWINGS

Prior Art

Present Invention

Figure 5:
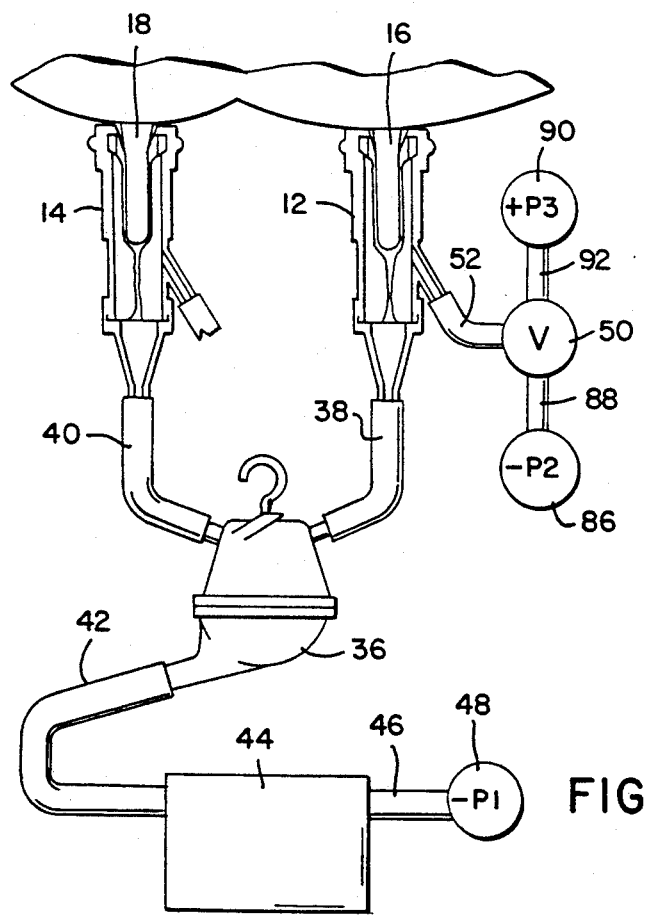

FIG. 5 shows a milking system in accordance with the present invention.

Figures 6, 7, 8:
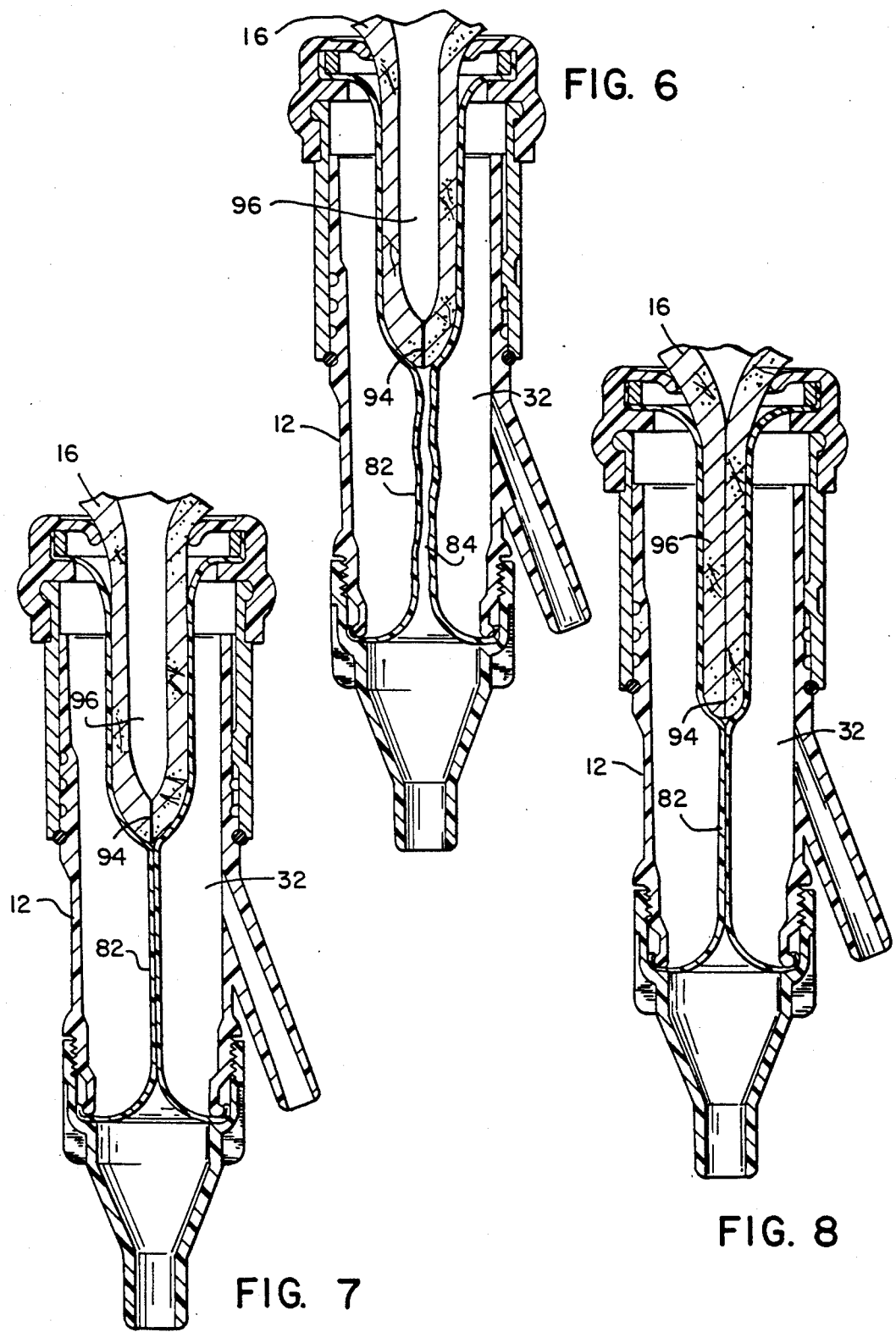

FIG. 6 shows a teat cup and liner during the on portion of a milking cycle in accordance with the present invention.

FIG. 7 shows a teat cup and liner during the transition from the on portion to the off portion of a milking cycle in accordance with the present invention.

FIG. 8 shows a teat cup and liner during the off portion of a milking cycle in accordance with the present invention.

Figure 9:
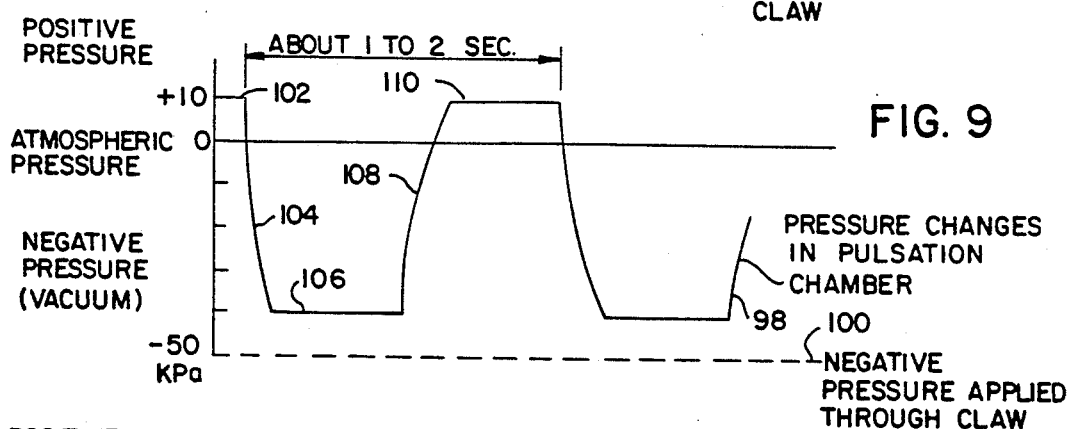

FIG. 9 is a graph showing pressure change during the milking cycle.

Figure 10:
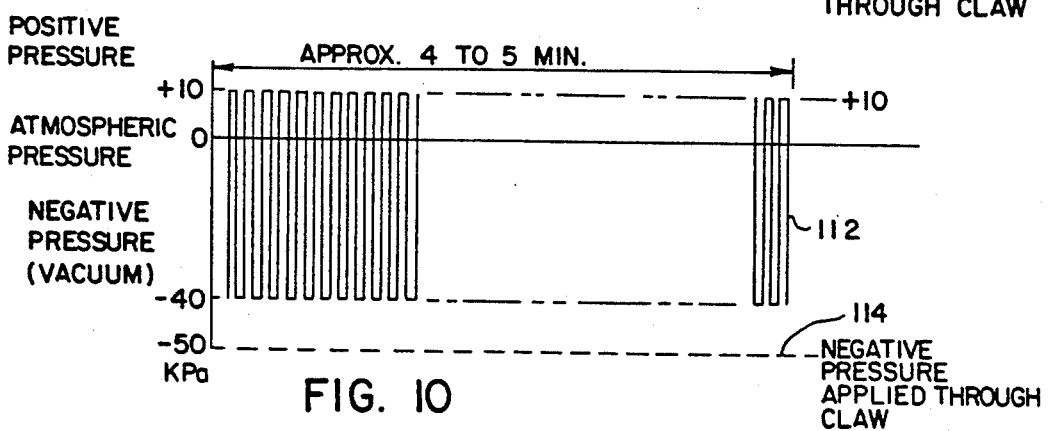

FIG. 10 is a graph showing pressure change over many of the cycles of FIG. 9.

FIG. 11 schematically illustrates the pressure switch operation of the present invention.

FIG. 12 illustrates the operation of FIG. 11 with a thin floppy liner.

FIG. 13 illustrates the operation of FIG. 12 on a teat.

DETAILED DESCRIPTION

Prior Art

Figure 1:
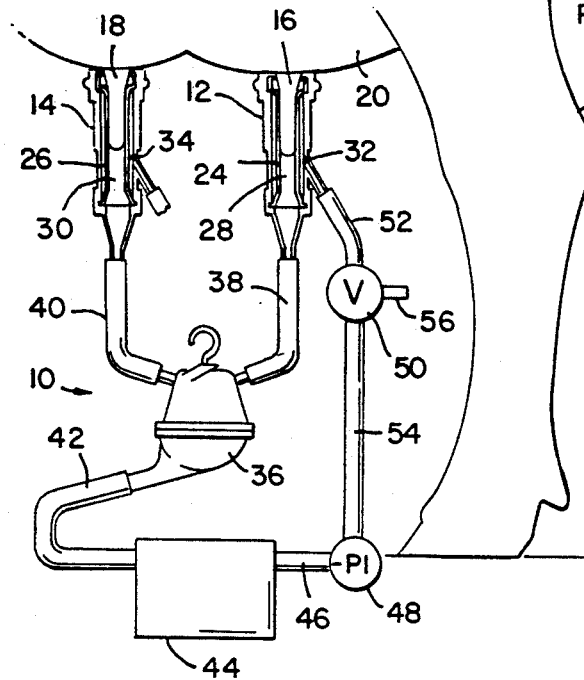
FIG. 1 schematically illustrates a milking system known in the prior art.

FIG. 1 shows a milking system 10 having a plurality of teat cups such as 12, 14 connected to respective teats such as 16, 18 depending from the udder 20 of a mammal 22 such as a cow. Each teat cup has a liner or inflation such as 24, 26 around a respective teat and defining a milk flow passage such as 28, 30 within the liner below the teat, and a pulsation chamber such as 32, 34 outside the liner between the liner and the teat cup. The teat cup and liner are shown and described in U.S. Pat. No. 4,530,307, incorporated herein by reference. A milking claw 36, for example as shown in U.S. Pat. No. 4,537,152, incorporated herein by reference, has a plurality of inlets receiving milk through tubes such as 38, 40 connected to respective teat cups to receive milk from respective milk flow passages such as 28, 30. The claw has a discharge tube 42 connected to milk collection container 44 having a vacuum connection tube 46 connected to a source of negative pressure 48. Negative pressure source 48 applies substantially constant negative pressure (vacuum), relative to atmospheric pressure, through claw 44 to milk flow passages 28, 30.

The system has a milking cycle with an on portion and an off portion. Milk flows from the teat towards claw 36 during the on portion. A pulsator valve 50 is connected to each of the teat cups at a connection tube such as 52 and has first and second conditions alternately and cyclically connecting the teat cup to the negative pressure source 48 through connection tube 54 during the on portion of the milking cycle, and connecting the teat cup to atmosphere through connection tube 56 during the off portion of the milking cycle. It is also known in the prior art to connect the teat cup to a source of positive pressure, relative to atmospheric pressure, during the off portion of the milking cycle, e.g. by supplying connection tube 56 with a source of positive pressure. During the off portion of the milking cycle, the positive pressure or atmospheric pressure applied through connection tube 56, valve 50, and connection tube 52 to pulsation chamber 32 of teat cup 12 collapses and closes liner 24 below teat 16 to block milk flow, and to relieve the teat from the negative pressure applied from source 48 through connection tube 46, container 44, connection tube 42, claw 36, and connection tube 38 to milk flow passage 28 at the lower end of liner 24. During the on portion of the milking cycle, negative pressure from source 48 is applied through connection tube 54, valve 50, and connection tube 52 to pulsation chamber 32 of teat cup 12, such that liner 24 opens to its normally open position and milk is withdrawn from teat 16.

Figure 2:
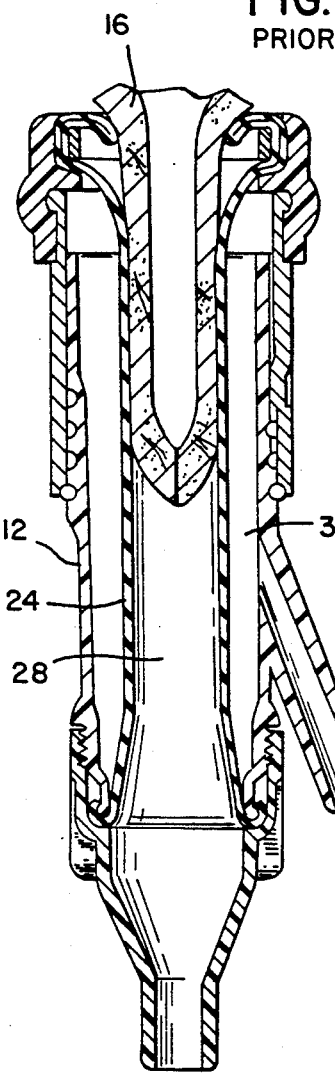
FIG. 2 shows a teat cup and liner during the on portion of a milking cycle as known in the prior art.
Figure 3:
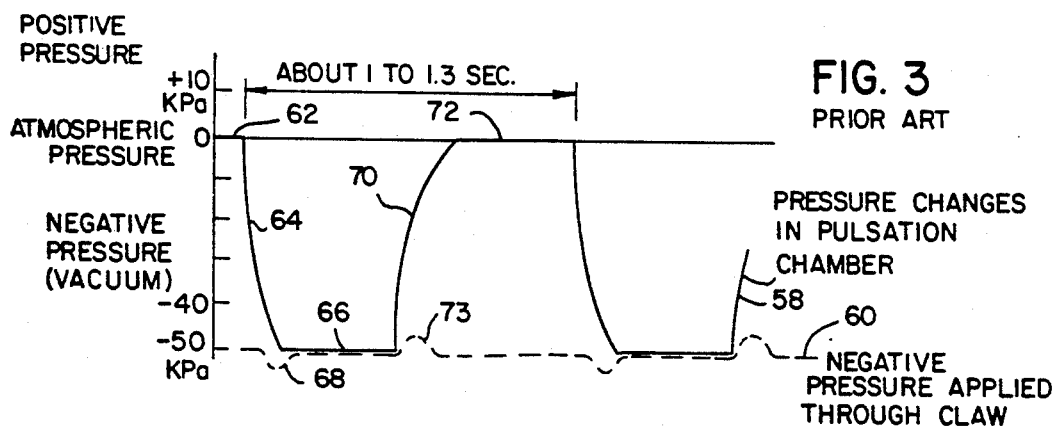
FIG. 3 is a graph showing pressure change during the milking cycle.

In FIG. 3, the pressure in pulsation chamber 32 is shown at solid line 58, and the pressure supplied through claw 36 to the interior of liner 28 is shown at dashed line 60. The period of the milking cycle is about 1 to 1.3 seconds. During the off portion of the milking cycle, the pressure in pulsation chamber 32 is at atmospheric pressure, i.e. zero relative to atmosphere, as shown at 62. During the transition from the off to the on portion of the milking cycle, pulsator valve 50 is switched to its alternate condition, connecting negative pressure source 48 through connection tube 54, valve 50, and connection tube 52 to pulsation chamber 32, such that the pressure in pulsation chamber 32 falls as shown at 64, FIG. 3, to lower level 66 which is a negative pressure, relative to atmosphere, as illustrated at $-50$ kPa, kilopascals, which is the pressure supplied by source 48. During transition 64, the pressure supplied through claw 36 to the interior of liner 24 may drop slightly as shown at 68. During the on portion of the milking cycle, with the pressure in pulsation chamber 32 at level 66, the position of liner 24 is as shown in FIG. 2. At the end of the on portion of the milking cycle, pulsator valve 50 is switched back to its other position, to connect atmospheric connection tube 56 through valve 50 and connection tube 52 to pulsation chamber 32, such that the pressure in pulsation chamber 32 rises as shown at 70 to level 72, and the cycle is repeated. During transition 70, the pressure supplied through claw 36 to the interior of liner 24 may rise slightly as shown at 73.

Figure 4:
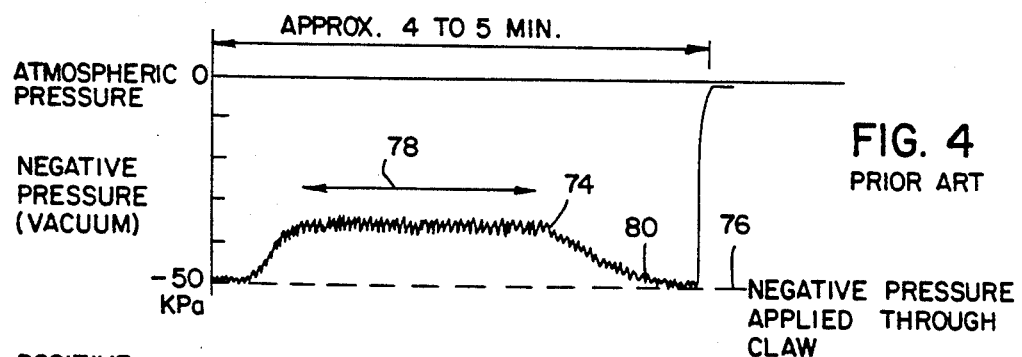
FIG. 4 is a graph showing pressure change over many of the cycles of FIG. 3.

FIG. 4 shows the pressure applied to the lower tip of the teat at solid line 74, and the pressure supplied from source 44 at dashed line 76, over an interval of about four to five minutes. During the peak milk flow, i.e. during interval 78, the milk flow increases the pressure, i.e. reduces the vacuum, in milk flow passage 28 within liner 24. These changes tend to reduce the milking rate, because of the lesser vacuum, and increase teat congestion and oedema at or near the end of milking at 80 because the pressure drops again, i.e. vacuum level rises again, as the milk flow rate decreases.

Present Invention

FIGS. 5-13 illustrate the present invention and use like reference numerals from FIGS. 1-4 where appropriate to facilitate understanding. The present invention uses a thin-walled non-distensible floppy liner 82, FIG. 6, such as mylar having a wall thickness of about 0.1 to 1.0 millimeter. The upper end of the liner is around teat 16, and the lower end of the liner communicates through connection tube 38 with milking claw 36. Liner 82 substantially conforms its shape to teat 16, and of itself provides substantially no load on the teat. Liner 82 on teat 16 defines milk flow passage 84 within the liner and pulsation chamber 32 outside the liner between the liner and teat cup 12. Negative pressure source 48, FIG. 5, applies negative pressure, relative to atmospheric pressure, through connection tube 46, container 44, connection tube 42, claw 36, and connection tube 38 to milk flow passage 84 in the interior of the lower end of liner 82. The milking cycle has an on portion and an off portion. Milk is withdrawn from the teat during the on portion. The milking cycle is implemented by alternately and cyclically applying positive and negative pressure, relative to atmospheric pressure, to pulsation chamber 32, to implement the off and on portions, respectively.

The present system collapses and closes liner 82 below the teat to block milk flow during the off portion of the milking cycle, FIG. 8, as in the prior art. However, during the on portion of the milking cycle, FIG. 6, the present method only partially opens liner 82, with minimum volume change below teat 16, to permit milk flow. Liner 82 is then collapsed and closed, FIGS. 7 and 8, and the cycle repeats. The minimum volume change within the liner below the teat, FIG. 6, reduces the chances of cross-contamination from another teat through claw 36.

In operation, pressure in pulsation chamber 32 is increased during the off portion of the milking cycle to increase the pressure applied to the teat and collapse and close liner 82 below teat 16, as shown at the transition stage in FIG. 7, and the fully closed stage in FIG. 8. The pressure in pulsation chamber 32 is decreased during the on portion of the milking cycle to decrease the pressure applied to the teat and to permit partial opening of liner 82 with minimum volume change within liner 82 below the teat. A differential pressure is provided across liner 82 during the on portion of the milking cycle by a second negative pressure source 86, FIG. 5, such that the pressure in pulsation chamber 32 during the on portion of the milking cycle is greater than the pressure supplied through claw 36 by negative pressure source 48. When valve 50 cycles to its on condition, the negative pressure from source 86 is supplied through connection tube 88, valve 50, and connection tube 52 to pulsation chamber 32. In the prior art, FIG. 3, and in the preferred embodiment of the present invention, FIG. 9, the negative pressure supplied by source 48 is typically in the range of about $-40$ to $-50$ kPa and is substantially constant, i.e. does not vary by more than about 5 or 6 kPa. In the preferred embodiment of the present invention, the differential pressure applied across liner 82 during the on portion of the milking cycle is in the range of about 3 to 10 kPa, i.e. the minimum pressure in pulsation chamber 32 during the on portion of the milking cycle is about 3 to 10 kPa above the pressure supplied through claw 36, FIG. 9. This range of differential pressure permits milk flow through passage 84, yet prevents full opening of the liner, FIG. 2, whereby to minimize volume change in milk flow passage B4 below teat 16 during the milking cycle. Pressure sources 48 and 86 may be connected by a regulator valve if desired to establish the relative differential pressure therebetween in the noted preferred range. Further alternatively, such regulator valve would enable elimination of second pressure source 86, if desired, i.e. would enable pressure source 48 to perform both of the noted first and second pressure source functions.

During the off portion of the milking cycle, valve 50 is in its off condition, and positive pressure, relative to atmospheric pressure, is supplied from pressure source 90 through connection tube 92, valve 50, and connection tube 52 to pulsation chamber 32. In the preferred embodiment, the maximum pressure in pulsation chamber 32 during the off portion of the milking cycle is in the range of about 10 to 20 kPa above atmospheric pressure. FIG. 7 shows a transitional stage in the milking cycle with pulsation chamber 32 at atmospheric pressure. FIG. 8 shows the off portion of the milking cycle with the teat canal 94 closed, the teat sinus 96 occluded, and substantially the entire length of the teat barrel flattened by the closed liner 82. The application of positive pressure to the pulsation chamber in the noted range during the off portion of the milking cycle in combination with the noted thin-walled non-distensible floppy liner provides a controlled cyclic pressure applied to the lower tip of the teat and along the barrel of the teat thereabove and maintains blood circulation at a physiologically acceptable level within the walls of the teat barrel as well as at the teat lower tip. The combination of controlled positive pressure and a thin non-distensible liner minimizes congestion, oedema and damage to the lower tip of the teat. Teats are softer after milking, and teat condition is improved.

As above noted, it is preferred that the liner be non-distensible, such as mylar. Alternatives include a thin elastic inner liner, e.g. silicon, latex, or polythene film, coated or supported by an outer nondistensible sleeve, e.g. nylon mesh. Outer sleeves are shown in U.S. Pat. Nos. 3,096,740 and 4,315,480.

In FIG. 9, the pressure in pulsation chamber 32 in FIGS. 5–8 is shown at solid line 98, and the pressure supplied through claw 36 to the interior of liner 82 is shown at dashed line 100. The period of the milking cycle may be longer than the prior art, for example about 1 to 2 seconds. During the off portion of the milking cycle, pulsator valve 50 is in a given condition connecting pressure source 90 through connection tube 92, valve 50, and connection tube 52 to pulsation chamber 32, and the pressure in pulsation chamber 32 is $+10$ kPa as shown at 102, i.e. 10 kPa above atmospheric pressure. During the transition from the off to the on portion of the milking cycle, pulsator valve 50 is switched to its alternate condition, connecting negative pressure source 86 through connection tube 88, valve 50, and connection tube 52 to pulsation chamber 32, such that the pressure in pulsation chamber 32 falls as shown at 104, FIG. 9, to level 106 which is $-40$ kPa, i.e. 40 kPa below atmospheric pressure. During the on portion of the milking cycle, with the pressure in pulsation chamber 32 at level 106, the position of liner 82 is as shown in FIG. 6. At the end of the on portion of the milking cycle, pulsator valve 50 is switched back to its other position, to connect positive pressure source 90 through connection tube 92, valve 50, and connection tube 52 to pulsation chamber 32, such that the pressure in pulsation chamber 32 rises as shown at 108 to $+10$ kPa as shown at 110, and the cycle is repeated.

FIG. 10 shows the pressure applied to the teat at solid line 112, and the pressure supplied through claw 36 at dashed line 114, over an interval of about four to five minutes. Comparing FIG. 10 with FIG. 4, it is seen that in FIG. 10 there is no change in the average pressure applied to the teat as there is in FIG. 4, and hence no reduction in milking rate because of lesser vacuum, nor increased teat congestion and oedema near the end of milking otherwise due to a pressure drop as at 80 in FIG. 4.

Thin-walled floppy liner 82 is operated as a pressure switch limiting the amount of negative pressure applied to the lower tip of teat 16. This is illustrated in FIGS. 11–13. In FIG. 11, a negative pressure of $-50$ kPa is applied at connection tube 38a on one side of rubber diaphragm 82a, and a negative pressure of $-40$ kPa is applied at connection tube 52a on the other side of rubber diaphragm 82a. As the pressure in connection tube 38a decreases from zero, such negative pressure appears in passage 84a. When the negative pressure in connection tube 38a reaches $-40$ kPa, the pressure differential on rubber diaphragm 82a is equalized, and any further reduction in pressure in connection tube 38a draws rubber diaphragm 82a downwardly to engage and seal the upper end 112 of connection tube 38a, and hence block communication of such further decreasing pressure in tube 38a from reaching passage 84a. Hence, the minimum pressure in passage 84a is $-40$ kPa. FIG. 12 illustrates the same limiting pressure switch action but using a thin floppy liner or sleeve 82b in place of rubber diaphragm 82a. If $-50$ kPa is applied at connection tube 38b, and $-40$ kPa is applied at connection tube 52b, the liner 82b closes and limits the pressure in passage 84b to $-40$ kPa. As the pressure in connection tube 38b decreases from zero, sleeve 82b will close when the pressure in tube 38b reaches $-40$ kPa. FIG. 13 shows the pressure switch action of FIG. 12 in conjunction with teat 16, with $-50$ kPa being supplied by connection tube 38 to milk flow passage 84 in liner 82, and with the pressure being supplied through connection tube 52 to pulsation chamber 32 varying between $+10$ kPa and $-40$ kPa, FIGS. 9 and 10. The pressure switch action of thin floppy liner 82 limits the amount of negative pressure applied to the lower tip of teat 16. The pressure in pulsation chamber 32 is decreased, 104, FIG. 9, during the on portion of the milking cycle to $-40$ kPa at level 106, such that liner 82 closes and blocks the $-50$ kPa pressure supplied through milking claw 36 and connection tube 38 from reaching the lower tip of the teat, and instead limits the amount of negative pressure applied to the lower tip of the teat to the $-40$ kPa pressure acting on thin-walled floppy liner 82 engaging the lower tip of the teat. Milk flow from the lower tip of the teat through milk flow passage 84 within liner 82 increases the pressure within the liner to equalize and slightly exceed the pressure in pulsation chamber 32 outside the liner to slightly open milk flow passage 84 until milk flow from the lower tip of the teat decreases to reduce the pressure within the liner such that the latter closes. The $-50$ kPa and the $-40$ kPa pressures provide differential pressure across the thin-walled floppy liner during the on portion of the milking cycle. The pressure in pulsation chamber 32 is increased, 108, FIG. 9, during the off portion of the milking cycle to $+10$ kPa, to collapse the thin-walled floppy liner and tightly close milking passage 84, and to apply the $+10$ kPa pressure along the teat by acting on the thin-walled floppy liner engaging the teat. The $+10$ kPa pressure is applied uniformly along the teat including the lower tip of the teat and the barrel of the teat above the lower tip.

It is recognized that various equivalents, alternatives and modifications are possible within the scope of the appended claims.

I claim:

1. A method for milking a mammal, comprising in combination:

providing a teat cup having a liner around a teat of the mammal and defining a milk flow passage within said liner and a pulsation chamber outside liner between said liner and said teat cup, said liner being a thin-walled floppy member substantially conforming its shape to the teat, and of itself providing substantially no load on the teat;

supplying negative pressure, relative to atmospheric pressure, to said milk flow passage;

providing a milking cycle having an on portion and an off portion, wherein milk is supplied from the teat during said on portion, implementing said milking cycle by alternately and cyclically applying positive and negative pressure, relative to atmospheric pressure, to said pulsation chamber, to implement said off and on portions, respectively, said positive pressure being uniformly applied along the teat including the lower tip of the teat and the barrel of the teat above the lower tip.

2. The method according to claim 1 wherein the maximum positive pressure in said pulsation chamber during said off portion of said milking cycle is in the range of about 10 to 20 kPa above atmospheric pressure.

3. A method for milking a mammal, comprising:
providing a teat cup having a thin-walled floppy liner having an upper end around a teat of the mammal, and a lower end communicating with a milking claw, and defining a milk flow passage within said liner, and a pulsation chamber outside said liner between said liner and said teat cup, said thin-walled floppy liner substantially conforming its shape to the teat and of itself providing substantially no load on the teat;
supplying a negative first pressure, relative to atmospheric pressure, through said claw to said milk flow passage at said lower end of said liner;
providing a milking cycle having an on portion and an off portion, wherein milk is supplied from the lower tip of the teat through said milk flow passage to said claw during said on portion, and wherein said liner is collapsed and closed during said off portion to block milk flow;
operating said thin-walled floppy liner as a pressure switch limiting the amount of negative pressure applied to the lower tip of the teat, by
decreasing the pressure in said pulsation chamber during said on portion of said milking cycle to a negative second pressure, relative to atmospheric pressure, wherein said second pressure is greater than said first pressure such that said second pressure provides lesser vacuum than the vacuum provided by said first pressure, such that said thin-walled floppy liner is closed and blocks communication of said negative first pressure to the lower tip of the teat and limits the amount of negative pressure applied to the lower tip of the teat to said negative second pressure acting on said thin-walled floppy liner engaging the lower tip of the teat, wherein milk flow from the lower tip of the teat within said thin-walled floppy liner increases the pressure within said thin walled floppy liner to equalize and slightly exceed the pressure in said pulsation chamber outside said thin-walled floppy liner to slightly open said milk flow passage until milk flow from the lower tip of the teat decreases to reduce the pressure within said thin-walled floppy liner such that the latter closes, said first and second pressures providing differential pressure across said thin-walled floppy liner during said on portion of said milking cycle, with the pressure in said pulsation chamber greater than the pressure supplied through said claw, and
increasing the pressure in said pulsation chamber during said off portion of said milking cycle to a positive third pressure, relative to atmospheric pressure, to collapse said thin-walled floppy liner and tightly close said milking passage and to apply said positive third pressure along the teat by acting on said thin-walled floppy liner engaging the teat, said positive third pressure being uniformly applied along the teat including the lower tip of the teat and the barrel of the teat above the lower tip.

4. The method according to claim 3 wherein the difference between said first and second pressures is in the range of about 3 to 10 kPa.

5. The method according to claim 4 wherein said third pressure is in the range of about 10 to 20 kPa above atmospheric pressure, and said first pressure is in the range of about 40 to 50 kPa below atmospheric pressure.

6. A method for milking a mammal, comprising in combination:
providing a plurality of teat cups each having a liner around a respective teat of the mammal and defining a milk flow passage within said liner below the teat and a pulsation chamber outside said liner between said liner and said teat cup, said liner being a thin-walled floppy member substantially conforming its shape to the teat, and of itself providing substantially no load on the teat, said milk flow passage supplying milk to a milking claw which also receives milk from milk flow passages of other liners of other teat cups;
supplying substantially constant negative pressure, relative to atmospheric pressure through said claw to said milk flow passage;
providing a milking cycle having an on portion and an off portion, wherein milk is supplied to said claw during said on portion, and implementing said milking cycle by
increasing the pressure in said pulsation chamber during said off portion of said milking cycle to a positive pressure, relative to atmospheric pressure, to increase the pressure applied to the teat and collapse and fully close said liner below the teat, said positive pressure being uniformly applied along the teat including the lower tip of the teat and the barrel of the teat above the lower tip,
decreasing the pressure in said pulsation chamber during said on portion of said milking cycle to a negative pressure, relative to atmospheric pressure, to decrease the pressure applied to the teat but maintaining a differential pressure across said liner such that the pressure in said pulsation chamber is greater than said substantially constant negative pressure supplied through said claw such that said pressure in said pulsation chamber during said on portion of said milking cycle provides lesser vacuum than the vacuum provided by said substantially constant negative pressure supplied through said claw, such that said liner only partially opens, with minimum volume change below the teat.
increasing the pressure again in said pulsation chamber and repeating the cycle.

7. The method according to claim 6 wherein:
said substantially constant negative pressure supplied through said claw is in the range of about 40 to 50 kPa below atmospheric pressure;
the maximum pressure in said pulsation chamber during said off portion of said milking cycle is in the range of about 10 to 20 kPa above atmospheric pressure;
the minimum pressure in said pulsation chamber during said on portion of said milking cycle is in the range of about 3 to 10 kPa above said substantially constant negative pressure supplied through said claw, to provide said differential pressure across said liner during said on portion of said milking cycle.

8. Apparatus for milking a mammal, comprising in combination:
- a teat cup having a liner around a test of the mammal and defining a milk flow passage within said liner and a pulsation chamber outside said liner between said liner and said teat cup, said liner being a thin-walled floppy member substantially conforming its shape to the teat, and of itself providing substantially no load on the teat;
- means supplying negative pressure, relative to atmospheric pressure, to said milk flow passage;
- cycling means providing a milking cycle having an on portion and an off portion, wherein milk is supplied from the teat during said on portion, and comprising means alternately and cyclically applying positive and negative pressure, relative to atmospheric pressure, to said pulsation chamber, to implement said off and on portions, respectively, said positive pressure being uniformly applied along the teat including the lower tip of the teat and the barrel of the teat above the lower tip.

9. The apparatus according to claim 8 wherein said means alternately and cyclically applying positive and negative pressure to said pulsation chamber provides maximum positive pressure in said pulsation chamber during said off portion of said milking cycle in the range of about 10 to 20 kPa above atmospheric pressure.

10. Apparatus for milking a mammal, comprising:
- a teat cup having a thin-walled floppy liner having an upper end around a teat of the mammal, and a lower end communicating with a milking claw, and defining a milk flow passage within said thin-walled floppy liner, and a pulsation chamber outside said thin-walled floppy liner between said thin-walled floppy liner and said teat cup, said thin-walled floppy liner substantially conforming its shape to the teat and of itself providing substantially no load on the teat;
- means supplying a negative first pressure, relative to atmospheric pressure, through said claw to said milk flow passage at said lower end of said thin-walled floppy liner;
- cycling means providing a milking cycle having an on portion and an off portion, wherein milk is supplied from the lower tip of the teat through said milk flow passage to said claw during said on portion, and wherein said thin-walled floppy liner is collapsed and closed during said off portion to block milk flow;
- means operating said thin-walled floppy liner as a pressure switch limiting the amount of negative pressure applied to the lower tip of the test, comprising
  - means applying a negative second pressure, relative to atmospheric pressure, to said pulsation chamber during said on portion of said milking cycle, wherein said second pressure is greater than said first pressure such that said second pressure provides lesser vacuum than the vacuum provided by said first pressure, such that said thin-walled floppy liner is closed and blocks communication of said negative first pressure to the lower tip of the teat and limits the amount of negative pressure applied to the lower tip of the teat to said negative second pressure acting on said thin-walled floppy liner engaging the lower tip of the teat, wherein milk flow from the lower tip of the teat within said thin-walled floppy liner increases the pressure within said thin-walled floppy liner to equalize and slightly exceed the pressure in said pulsation chamber outside said thin-walled floppy liner to slightly open said milk flow passage until milk flow from the lower tip of the teat decreases to reduce the pressure within said thin-walled floppy liner such that the latter closes, said first and second pressures providing differential pressure across said thin-walled floppy liner during said on portion of said milking cycle, with the pressure in said pulsation chamber greater than the pressure supplied through said claw, and
- means applying a positive third pressure, relative to atmospheric pressure, to said pulsation chamber during said off portion of said milking cycle to collapse and close said thin walled floppy liner and tightly close said milking passage and to apply said positive third pressure along the teat by acting on said thin-walled floppy liner engaging the teat, said positive third pressure being uniformly applied along the teat including the lower tip of the teat and the barrel of the teat above the lower tip.

11. The apparatus according to claim 10 wherein the difference between said first and second pressures is in the range of about 3 to 10 kPa.

12. The apparatus according to claim 11 wherein said third pressure is in the range of about 10 to 20 kPa above atmospheric pressure, and said first pressure is in the range of about 40 to 50 kPa below atmospheric pressure.

13. Apparatus for milking a mammal, comprising in combination:
- a plurality of teat cups each having a liner around a respective teat of the mammal and defining a milk flow passage within said liner below the teat and a pulsation chamber outside said liner between said liner and said teat cup, said liner being a thin-walled floppy member substantially conforming its shape to the teat, and of itself providing substantially no load on the teat;
- a milking claw receiving milk from the milk flow passages of said teat cups;
- means supplying substantially constant negative pressure below atmospheric pressure, through said claw to said milk flow passages;
- cycling means providing a milking cycle having an on portion and an off portion, wherein milk is supplied to said claw during said on portion, comprising
  - means increasing the pressure in said pulsation chamber during said off portion of said milking cycle to a positive pressure, relative to atmospheric pressure, to increase the pressure applied to the teat and collapse and fully close said liner below the teat, said positive pressure being uniformly applied along the teat including the lower tip of the teat and the barrel of the teat above the lower tip,
  - means decreasing the pressure in said pulsation chamber during said on portion of said milking cycle to a negative pressure, relative to atmospheric pressure, to decrease the pressure applied to the teat but maintaining a differential pressure across said liner such that the pressure in said pulsation chamber is greater than said substantially constant negative pressure supplied through said claw such that said pressure in said pulsation chamber during said on portion of said milking cycle provides lesser vacuum than the vacuum provided by said substantially constant negative pressure supplied through said claw, such that said liner only partially opens, with minimum volume change below the teat.

14. The apparatus according to claim 13 wherein:
said substantially constant negative pressure supplied through said claw is in the range of about 40 to 50 kPa below atmospheric pressure;
the maximum pressure in said pulsation chamber during said off portion of said milking cycle is in the range of about 10 to 20 kPa above atmospheric pressure;
the minimum pressure in said pulsation chamber during said on portion of said milking cycle is in the range of about 3 to 10 kPa above said substantially constant negative pressure supplied through said claw, to provide said differential pressure across said liner during said on portion of said milking cycle.

15. Apparatus for milking a mammal, comprising in combination:
a teat cup having a liner around a teat of the mammal and defining a milk flow passage within said liner and a pulsation chamber outside said liner between said liner and said teat cup, said liner being a thin-walled floppy member substantially conforming its shape to the teat, and of itself providing substantially no load on the teat;
a first pressure source supplying negative pressure, relative to atmospheric pressure, to said milk flow passage;
cycling means providing a milking cycle having an on portion and an off portion, wherein milk is supplied from the teat during said on portion;
a second pressure source supplying negative pressure, relative to atmospheric pressure, to said pulsation chamber during said on portion of said milking cycle;
a third pressure source supplying positive pressure, relative to atmospheric pressure, to said pulsation chamber during said off portion of said milking cycle, said positive pressure from said third pressure source being uniformly applied along the teat including the lower tip of the teat and the barrel of the teat above the lower tip.

16. The apparatus according to claim 15 wherein the pressure supplied by said second pressure source is higher than the pressure supplied by said first pressure source such that the pressure supplied by said second pressure source provides lesser vacuum than the vacuum provided by the pressure supplied by said first pressure source.

* * * * *